United States Patent
Kwag et al.

(10) Patent No.: US 10,356,884 B2
(45) Date of Patent: Jul. 16, 2019

(54) LIGHTING APPARATUS THAT DETERMINES WHETHER NETWORK INFORMATION TO CONNECT TO A NETWORK IS EFFECTIVE AND METHOD OF CONTROLLING THE SAME

(71) Applicant: SAMSUNG ELECTRONICS CO., LTD., Suwon-si, Gyeonggi-do (KR)

(72) Inventors: Heui-sam Kwag, Suwon-si (KR); Jin-sung Kim, Seoul (KR); Chung-hee Lee, Seoul (KR); Ju-young Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 5 days.

(21) Appl. No.: 15/528,384

(22) PCT Filed: Nov. 25, 2015

(86) PCT No.: PCT/KR2015/012688
§ 371 (c)(1),
(2) Date: May 19, 2017

(87) PCT Pub. No.: WO2016/085245
PCT Pub. Date: Jun. 2, 2016

(65) Prior Publication Data
US 2017/0325324 A1    Nov. 9, 2017

(30) Foreign Application Priority Data
Nov. 26, 2014   (KR) ........................ 10-2014-0166626

(51) Int. Cl.
*H05B 37/02*    (2006.01)
*H05B 33/08*    (2006.01)
(Continued)

(52) U.S. Cl.
CPC ..... *H05B 37/0272* (2013.01); *F21V 23/0435* (2013.01); *H05B 33/0845* (2013.01); *H04L 2012/2841* (2013.01)

(58) Field of Classification Search
CPC ............ H05B 33/0845; H05B 33/0857; H05B 33/0872; H05B 35/00; H05B 37/0272;
(Continued)

(56) References Cited

U.S. PATENT DOCUMENTS 7,088,263 B1 *   8/2006   Krause ................. G08G 5/0026
                                                          244/114 R
8,033,686 B2    10/2011   Recker et al.
(Continued)

FOREIGN PATENT DOCUMENTS

CN       201081098        7/2008
CN       203590555 U      5/2014
(Continued)

OTHER PUBLICATIONS

International Search Report dated Feb. 24, 2016 in corresponding International Application No. PCT/KR2015/012688.
(Continued)

*Primary Examiner* — Tung X Le
*Assistant Examiner* — Borna Alaeddini
(74) *Attorney, Agent, or Firm* — Staas & Halsey LLP

(57) ABSTRACT

Provided is a lighting apparatus including a memory configured to store wireless network information of the lighting apparatus, a detection circuit configured to detect an alternating current signal supplied to the lighting apparatus, and a processor configured to initialize wireless network information of the lighting apparatus, based on the detected alternating current signal.

17 Claims, 9 Drawing Sheets

(51) Int. Cl.
*F21V 23/04* (2006.01)
*H04L 12/28* (2006.01)

(58) Field of Classification Search
CPC ............ H05B 37/0227; H05B 37/0281; H05B 37/0218; H04L 69/24; H04L 67/10; H04L 67/1093; H04L 2012/2841; H04L 41/0809; H04L 41/0886; Y02B 20/44; Y02B 20/348; Y02B 20/42; Y02B 10/72; Y02B 20/46

See application file for complete search history.

(56) References Cited

U.S. PATENT DOCUMENTS

| | | | |
|---|---|---|---|
| 9,113,528 B2* | 8/2015 | Bora .................. | H05B 33/0863 |
| 2006/0049935 A1* | 3/2006 | Giannopoulos ........ | H05B 37/02 |
| | | | 340/533 |
| 2011/0080091 A1* | 4/2011 | Staab ................ | H05B 37/0227 |
| | | | 315/61 |
| 2011/0133655 A1* | 6/2011 | Recker ...................... | H02J 9/02 |
| | | | 315/159 |
| 2011/0241848 A1* | 10/2011 | Van Herk .......... | H05B 37/0245 |
| | | | 340/12.5 |
| 2011/0248643 A1* | 10/2011 | Liu .................... | H05B 37/0272 |
| | | | 315/291 |
| 2012/0098650 A1 | 4/2012 | Gray et al. | |
| 2012/0299509 A1* | 11/2012 | Lee ..................... | H04L 41/0806 |
| | | | 315/291 |
| 2012/0306378 A1* | 12/2012 | Oh ..................... | H05B 37/0272 |
| | | | 315/151 |
| 2014/0159588 A1 | 6/2014 | So | |
| 2015/0048760 A1 | 2/2015 | Kwag et al. | |
| 2015/0163880 A1 | 6/2015 | Sun et al. | |
| 2016/0037615 A1* | 2/2016 | Davis ................. | H05B 37/0272 |
| | | | 315/291 |
| 2016/0057839 A1 | 2/2016 | Kwag et al. | |

FOREIGN PATENT DOCUMENTS

| | | |
|---|---|---|
| KR | 10-2015-0019366 | 2/2015 |
| TW | 201141314 A1 | 11/2011 |
| WO | 2014/138822 | 9/2014 |

OTHER PUBLICATIONS

Written Opinion of the International Searching Authority dated Feb. 24, 2016 in corresponding International Application No. PCT/KR2015/012688.
Chinese Office Action dated Dec. 18, 2018, in Chinese Patent Application No. 201580061031.0.
Extended European Search Report dated Feb. 12, 2018 in European Patent Application No. 15862247.2.

* cited by examiner

[Figure 1]
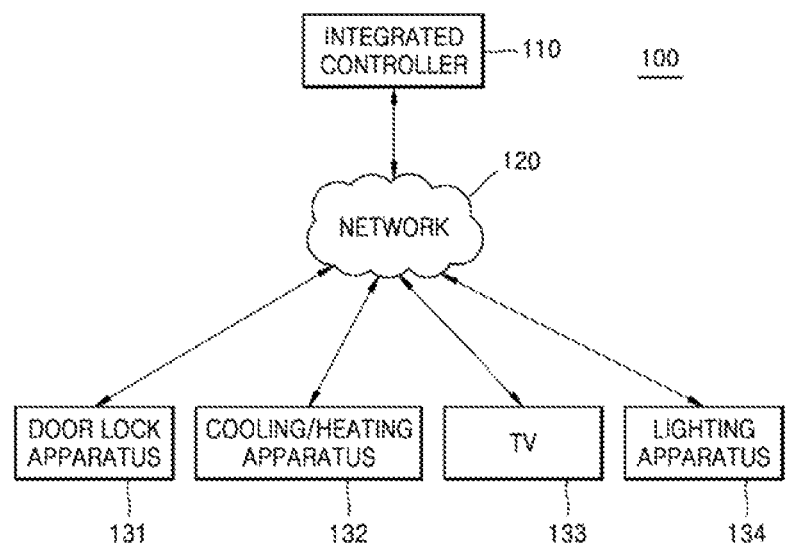

[Figure 2]
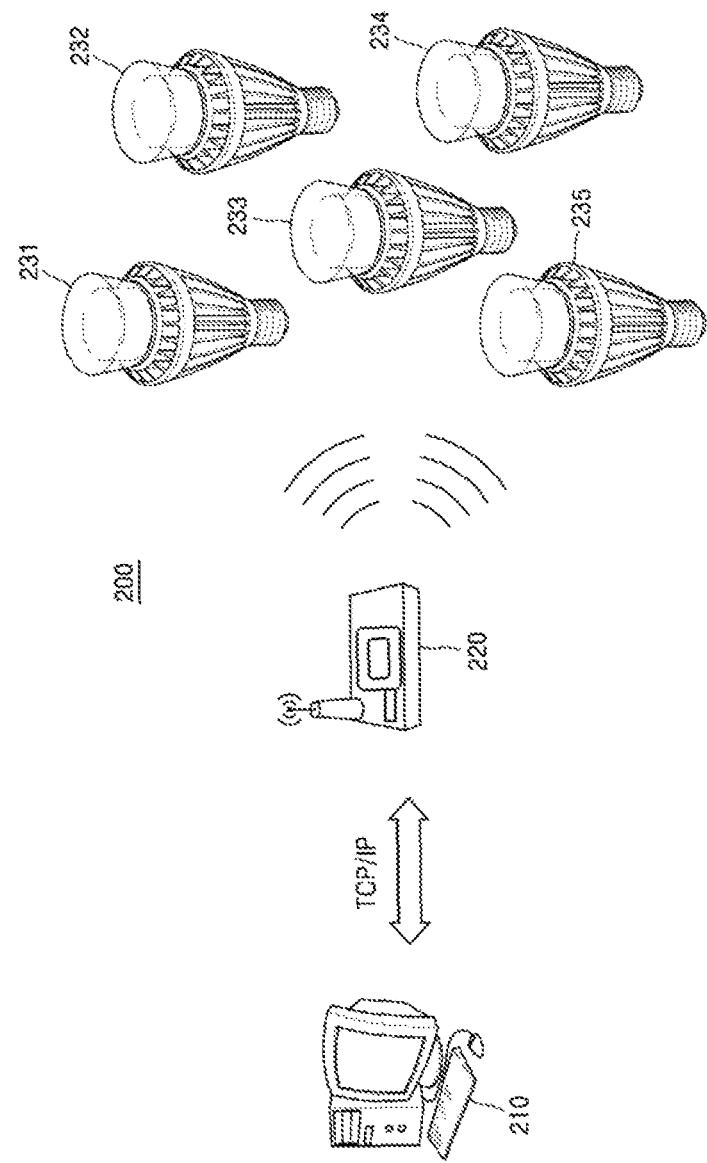

[Figure 3]
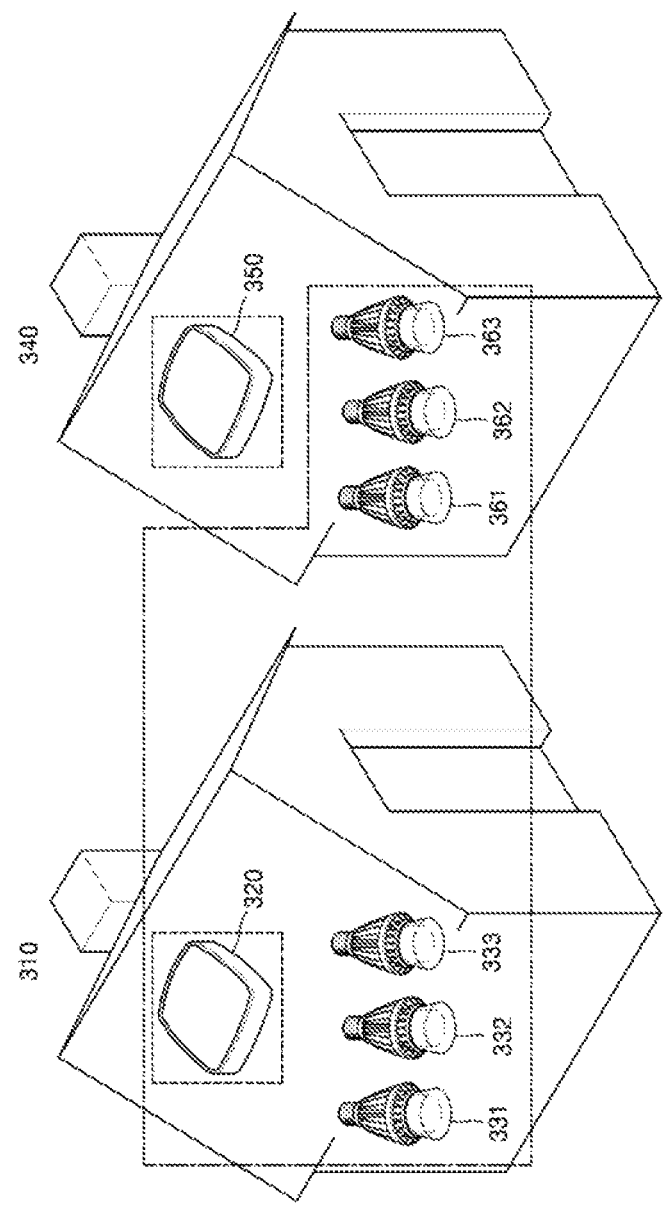

[Figure 4a]
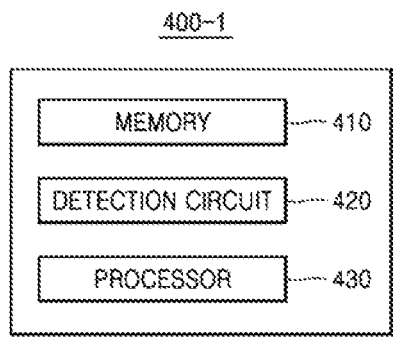
[Figure 4b]
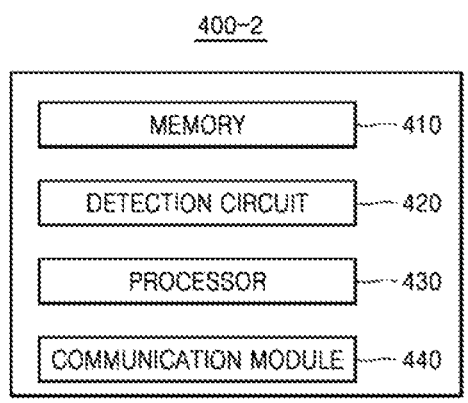
[Figure 5]
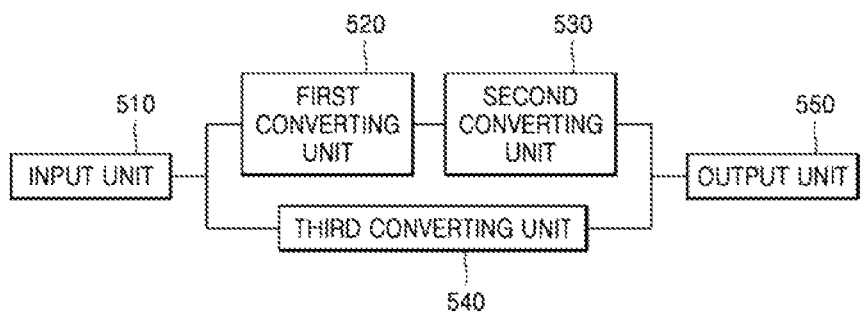

[Figure 6]
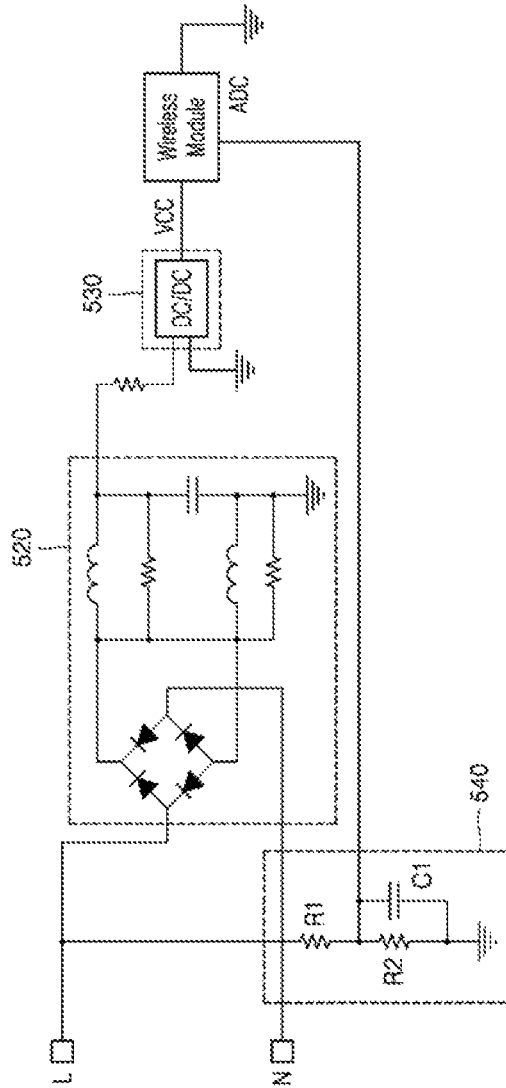
[Figure 7]
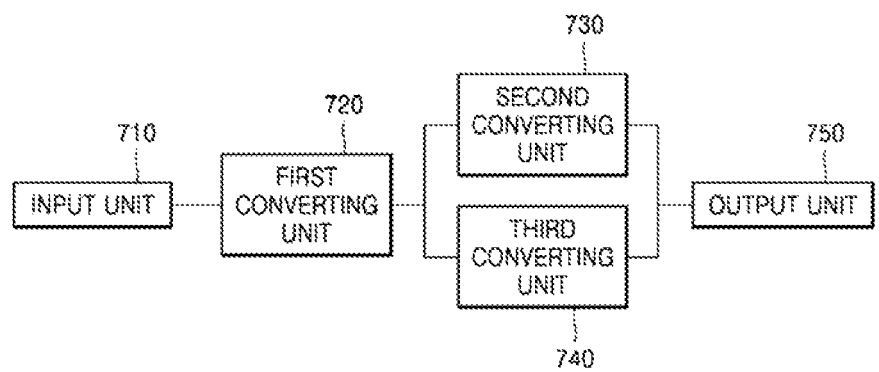

[Figure 8]
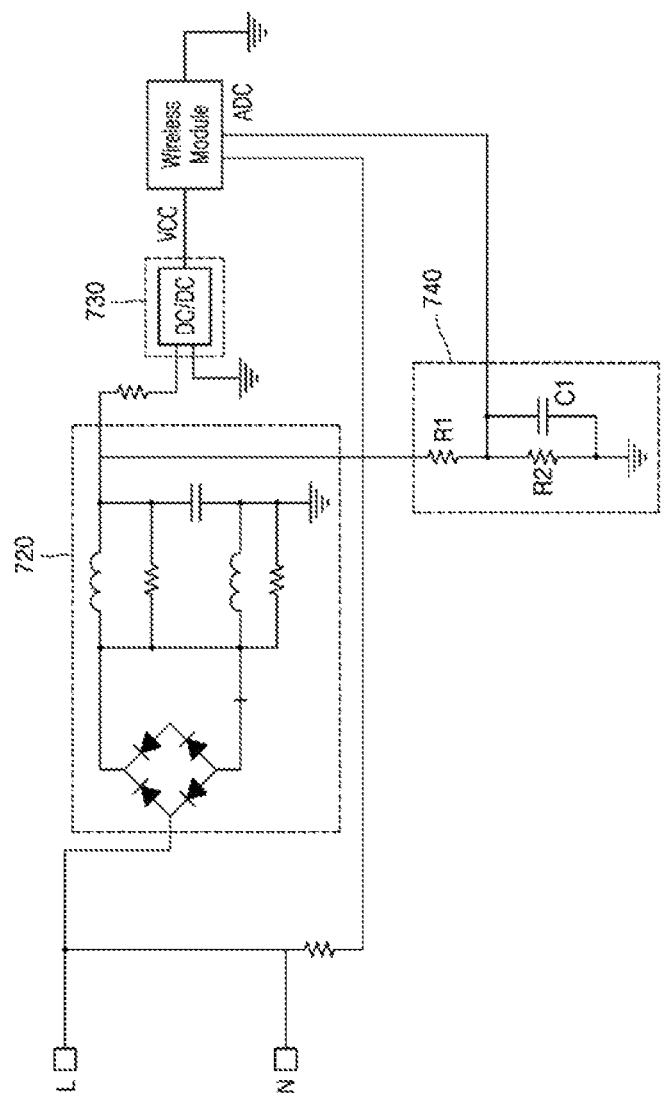

[Figure 9]
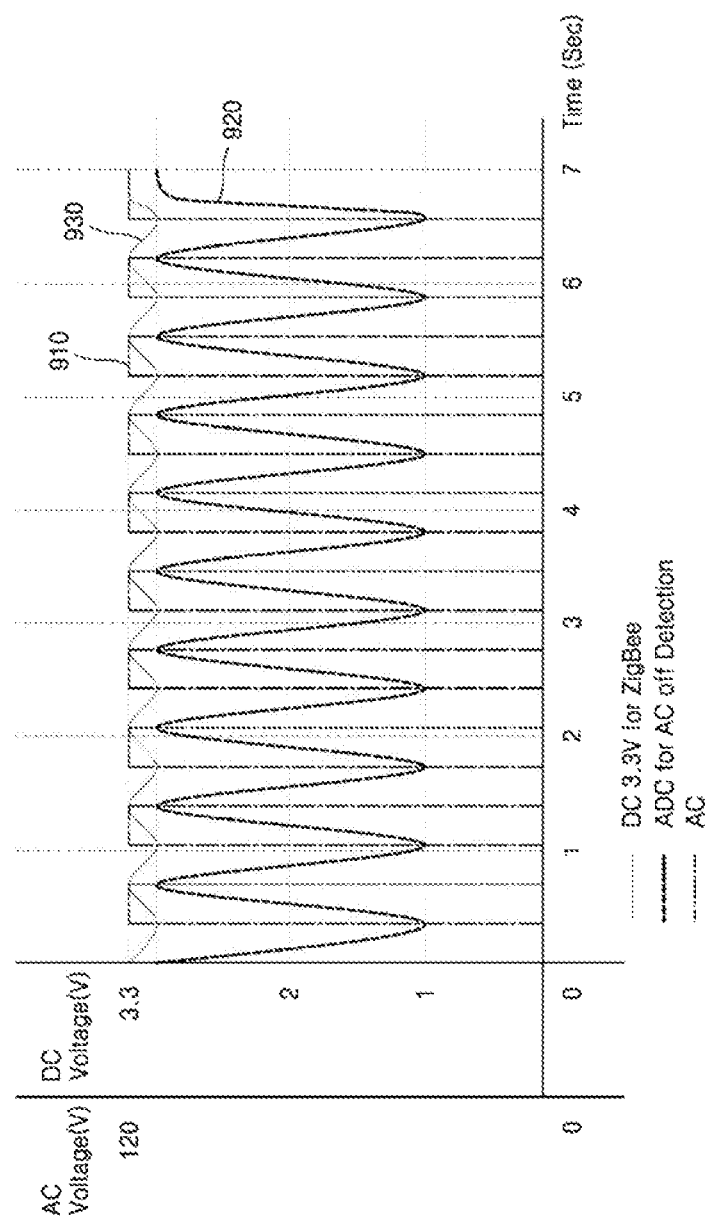

[Figure 10]
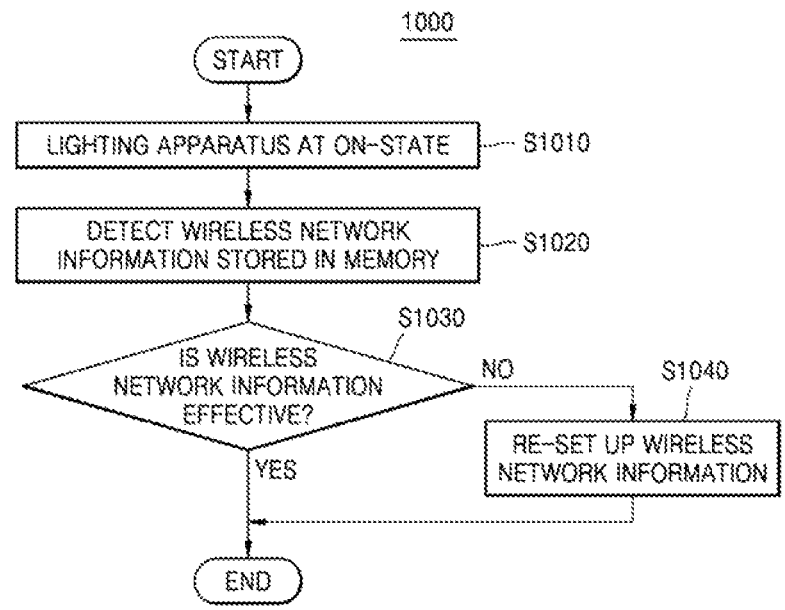
[Figure 11]
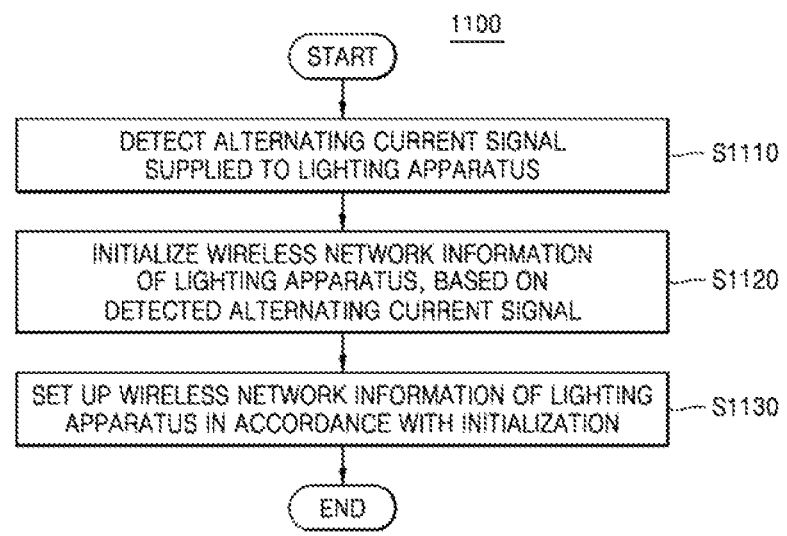

[Figure 12]
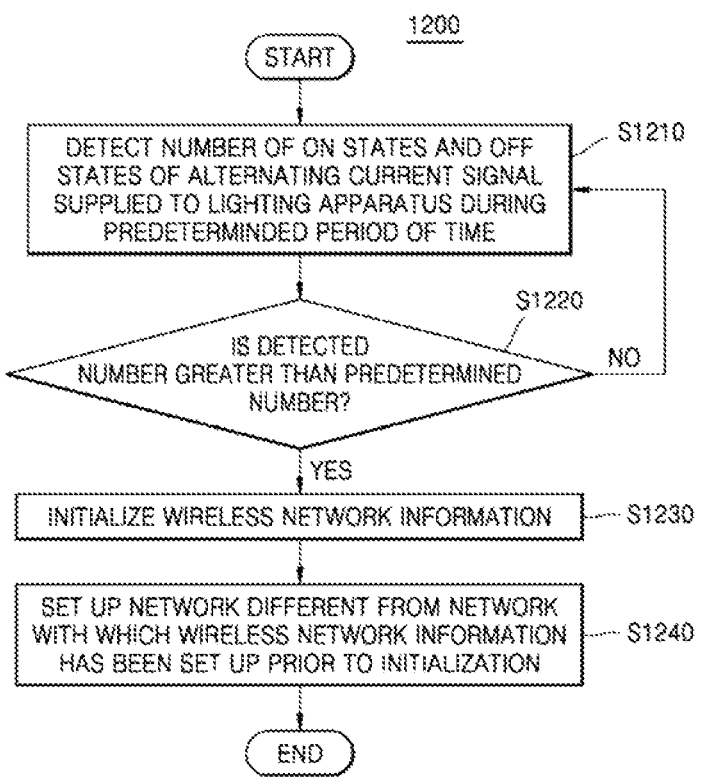

LIGHTING APPARATUS THAT DETERMINES WHETHER NETWORK INFORMATION TO CONNECT TO A NETWORK IS EFFECTIVE AND METHOD OF CONTROLLING THE SAME

CROSS-REFERENCE TO RELATED APPLICATIONS

This application is a U.S. National Stage Application, which claims the benefit under 35 U.S.C. § 371 of PCT International Patent Application No. PCT/KR2015/012688, Nov. 25, 2015, which claims the foreign priority benefit under 35 U.S.C. § 119 of Korean Patent Application No. 10-2014-0166626, Nov. 26, 2014, the contents of which are incorporated herein by reference.

TECHNICAL FIELD

The present disclosure relates to a lighting apparatus and a method of controlling the same, and more particularly, to a wireless lighting apparatus and a method of controlling a network set-up of the wireless lighting apparatus.

BACKGROUND ART

Various types of lighting apparatuses are used in offices and family houses. When all lighting apparatuses in an office or family house operate simultaneously, current consumption may increase, and accordingly, a method of efficiently managing the lighting apparatuses is needed.

In this regard remote control using a wireless control apparatus has been common employed. To this end, a wireless network has to be set up in order to control lighting via a wireless lighting control system.

When the wireless network for controlling the lighting apparatuses is not properly set up, the lighting apparatuses cannot be controlled through the wireless network. Accordingly, a method of controlling a wireless network set-up of a wireless lighting apparatus is required.

DISCLOSURE

Technical Solution

A lighting apparatus comprises a memory configured to store wireless network information of the lighting apparatus; a detection circuit configured to detect an alternating current signal supplied to the lighting apparatus; and a processor configured to initialize wireless network information of the lighting apparatus, based on the detected alternating current signal.

Advantageous Effects

A lighting apparatus comprises a memory configured to store wireless network information of the lighting apparatus; a detection circuit configured to detect an alternating current signal supplied to the lighting apparatus; and a processor configured to initialize wireless network information of the lighting apparatus, based on the detected alternating current signal.

DESCRIPTION OF DRAWINGS

These and/or other aspects will become apparent and more readily appreciated from the following description of the exemplary embodiments, taken in conjunction with the accompanying drawings, in which reference numerals denote structural elements, wherein:

FIG. 1 is a conceptual view of a smart management system according to an aspect of an embodiment;

FIG. 2 is a conceptual view of a lighting management system according to an aspect of an embodiment;

FIG. 3 is a perspective view illustrating a set-up of a wireless lighting network according to an aspect of an embodiment;

FIG. 4A is a block diagram illustrating a configuration of a lighting apparatus according to an aspect of an embodiment;

FIG. 4B is a block diagram illustrating a configuration of a lighting apparatus according to an aspect of another embodiment;

FIG. 5 is a block diagram illustrating a connection relation between elements of a detection circuit of a lighting apparatus according to an aspect of an embodiment;

FIG. 6 is a circuit diagram illustrating the block diagram of FIG. 5 in detail according to an aspect of an embodiment;

FIG. 7 is a block diagram illustrating a connection relation between elements of a detection circuit of a lighting apparatus according to an aspect of another embodiment;

FIG. 8 is a circuit diagram illustrating the block diagram of FIG. 7 in detail according to an aspect of an embodiment;

FIG. 9 is a graph illustrating an AC signal detected over time according to an aspect of an embodiment;

FIG. 10 is a flow chart illustrating a set-up flow of a network of a lighting apparatus according to an aspect of an embodiment;

FIG. 11 is a flow chart illustrating a set-up flow of a network of a lighting apparatus according to an aspect of an embodiment; and FIG. 12 is a flow chart illustrating a set-up flow of a network of a lighting apparatus according to another aspect of an embodiment.

BEST MODEL

When an ON state and an OFF state of an alternating current (AC) signal occur repeatedly in a lighting apparatus, the lighting apparatus may initialize network information thereof based on the on-state and the off-state of the lighting apparatus.

When network information of the lighting apparatus is initialized, the lighting apparatus reset network information.

Provided is a lighting apparatus including a memory configured to store wireless network information of the lighting apparatus; a detection circuit configured to detect an alternating current signal supplied to the lighting apparatus; and a processor configured to initialize wireless network information of the lighting apparatus, based on the detected alternating current signal, according to an aspect of the present inventive concept.

Additional aspects will be set forth in part in the description which follows and, in part, will be apparent from the description, or may be learned by practice of the presented exemplary embodiments.

In some embodiments, a lighting apparatus may further include a communication module configured to set up a wireless network of the lighting apparatus in accordance with the initialization.

The processor may obtain decision information about initializing the wireless network information and initialize the wireless network information stored in the memory, and the communication module may set up a wireless network different from the wireless network in which the wireless network information has been set up prior to the initialization.

In some embodiments, a detection circuit may detect a number of ON states and the number of OFF states of the AC signal, and a processor may obtain decision information about initialization of the wireless network information based on the number of ON states and the number of the OFF states.

At this point, when a total of a number of ON states and a number of OFF states of the AC signal is greater than a predetermined number, the process may initialize the wireless network information.

In addition, when the AC signal is in the OFF state, the detection circuit may supply power to the communication module.

In addition, the wireless network information may include identification information of a gateway configured to control the lighting apparatus.

The detection circuit may include an input unit configured to receive the AC signal; a first converting unit converting the AC signal to a first direct current (DC) signal; a second converting unit converting the first DC signal to a second DC signal predetermined in the communication module; a third converting unit converting the AC signal to a level convertible to a digital signal in the communication module; and an output unit configured to output the converted AC signal and the second DC signal.

In some embodiments, the first converting unit and the second converting unit may be connected, in series, to each other, and the third converting unit may be connected, in parallel, to an input terminal of the first converting unit and an output terminal of the second converting unit.

In some embodiments, the second converting unit may be connected, in parallel, to the third converting unit, and the output terminal of the first converting unit may be connected, in series, to the input terminal of a parallel circuit wherein the second converting unit and the third converting unit are connected to each other.

The third converting unit may include at least two of resistors and at least one of capacitors.

In some embodiments, the at least one of capacitors may be connected, in parallel, to one resistor of the at least two of resistors.

According to another aspect of the present inventive concept, a method of controlling a lighting apparatus is provided, wherein the method may include detecting an AC signal supplied to the lighting apparatus; and initializing wireless network information of the lighting apparatus, based on the detected AC signal.

In some embodiments, the method of controlling the lighting apparatus may further include setting up of a wireless network of the lighting apparatus in accordance with the initialization.

In some embodiments, the method of controlling the lighting apparatus may further include obtaining information to initialize the wireless network information, wherein the setting up a wireless network of the lighting apparatus may include setting up a wireless network different from the wireless network in which the wireless network information has been set up prior to the initialization.

The detecting an AC signal supplied to the lighting apparatus may include detecting a number of ON states and a number of OFF states of the AC signal during a predetermined period of time, and the obtaining decision information about initializing wireless network information of the lighting apparatus may be obtaining decision information about initializing the wireless network information, based on the number of ON states and the number of OFF states.

In some embodiments, when the number of ON states and the number of OFF states of the AC signal may be greater than a predetermined number, the obtaining decision information about initializing wireless network information of the lighting apparatus may include obtaining decision information about initializing the wireless network information.

In addition, when the AC signal is at the off-state, the method of controlling the lighting apparatus may further include supplying power to a communication module of the lighting apparatus.

The wireless network information may include identification information about a gateway configured to control the lighting apparatus.

According to another aspect of the present inventive concept, a non-transitory computer-readable recording medium storing programs to execute a method of controlling a lighting apparatus, the non-transitory computer-readable recording medium is provided, wherein the method of controlling the lighting apparatus may include detecting an AC signal supplied to the lighting apparatus; and initializing wireless network information of the lighting apparatus, based on the detected AC signal.

Mode for Invention

This application claims the benefit of Korean Patent Application No, 10-2014-0166626, filed on Nov. 26, 2014, in the Korean Intellectual Property Office, the disclosure of which is incorporated herein in its entirety by reference.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

To promote understanding of one or more embodiments of the inventive concept, reference has been made to the exemplary embodiments illustrated in the drawings, and specific language has been used to describe these embodiments. However, no limitation of the scope of the inventive concept is intended by this specific language, and embodiments of the inventive concept should be construed to encompass all embodiments that would normally occur to one of ordinary skill in the art.

The inventive concept will now be described more fully with reference to the accompanying drawings, in which exemplary embodiments of the inventive concept are shown. The inventive concept may, however, be embodied in many different forms and should not be construed as being limited to the embodiments set forth herein; rather, these embodiments are provided so that this disclosure will be thorough and complete, and will fully convey the concept of the inventive concept to those skilled in the art.

Throughout the specification, when a portion "includes" an element, another element may be further included, rather than excluding the existence of the other element, unless otherwise described. In addition, the term "unit" used in the specification may denote an element composed of hardware, such as a field programmable gate array (FPGA) or an application-specific integrated circuit (ASIC), or software and may perform a particular task. However, the "unit" is not limited to software and hardware and may be a non-transitory storing medium containing instructions for addressing and controlling at least one processor. Thus, the "unit" may include, for example, components such as software components, object-oriented software components, class components and task components, and processes, functions, attributes, procedures, subroutines, segments of program codes, drivers, arrays, and variables. The functions provided by the components may be combined and assigned to a smaller number of components or other "units" or may be further divided and assigned to additional components or other "units".

While such terms as "first," "second," etc., may be used to describe various elements, such elements must not be limited to the above terms. The above terms are used only to distinguish one element from another. For example, without departing a scope of rights of the specification, a first element may be referred to as a second element, and similarly, the second element may be referred to as the first element. As used herein, the term "and/or" includes any and all combinations of one or more of the associated listed items.

FIG. 1 is a conceptual view of a smart management system 100 of the present inventive concept, according to an aspect of an embodiment.

Along with the developments in network technologies, a network may be configured not only in an office but also at home along. Referring to FIG. 1, a door lock apparatus 131, home appliances such as a cooling/heating apparatus 132 and a TV 133, and a lighting apparatus 134 may be installed in a residential space. The door lock apparatus 131, the cooling/heating apparatus 132, the TV 133, and the lighting apparatus 134 may be managed by an integrated controller 110.

According to an aspect of an embodiment, the integrated controller 110 may be connected to a network 120 by wire or wirelessly, and may exchange data with the door lock apparatus 131, the cooling/heating apparatus 132, the TV 133, and the lighting apparatus 134. The integrated controller 110 may include at least one of components enabling communication with an external device. For example, the integrated controller 110 may include a short-range communication module, a wired communication module, and a mobile communication module.

According to an aspect of an embodiment, the network 120 may include a wired communication network and a wireless communication network. The wireless communication network may include wireless local area network (LAN), WiFi, Bluetooth, Zigbee, WiFi-direct (WFD), ultra wideband (UWB), infrared data association (IrDA), Bluetooth low energy (BLE), near field communication (NFC), etc.; however, it is not limited thereto.

As illustrated in FIG. 1, the door lock apparatus 131, the cooling/heating apparatus 132, the TV 133, and the lighting apparatus 134 may be managed by a single integrated controller 110. A user may sequentially control all or a portion of each apparatus by using the integrated controller 110. The integrated controller 110 may include a smart phone, a laptop computer, personal digital assistant (PDA), a tablet PC, etc.; however, it is not limited thereto.

FIG. 2 is a conceptual view of a smart management system 200 of the present inventive concept according to an aspect of an embodiment.

FIG. 2 illustrates the lighting control system 200 configured to control a plurality of lighting apparatuses installed in a house or office. The lighting control system 200 based on wireless communications may include a server 210, a wireless lighting controller 220 and wireless modules each installed on lightings 231 through 235.

According to an aspect of an exemplary embodiment, the server 210 may store information to control and manage the lighting system. In detail, the server 210 may store information on functions such as a lighting state, a lighting type, current consumption, lighting, mode set-up and power on/off.

According to an aspect of an embodiment, the wireless lighting controller 220 may be connected to wireless modules installed on each of lightings 231 through 235, etc. via a wireless communication. The server 210 and the wireless lighting controller 220 may be connected to each other by wire or wirelessly. Wireless modules mounted on each of lightings 231 through 235 may perform a role of turning on or off, or controlling brightness in accordance with a control command of the wireless lighting controller 220.

According to an aspect of an embodiment, a portion or all of the server 210 included in the lighting control system 200, the wireless lighting controller 220, and wireless modules mounted on each of lightings 231 through 235 may be operated by a hardware module; however, it is not limited thereto, and a portion of elements described above may be operated by software.

According to an aspect of an embodiment, a user may obtain a remote connection to the lighting control system 200 by using a computer or a portable mobile device, and may control the lighting system installed at home or at office. In detail, the user may obtain a connection onto a web page of the lighting control system 200 by using a notebook, PDA or a smart phone, and may control all of a portion of a plurality of lighting systems. Thus, the user may control each of a plurality of lightings installed at home or at office, and may reduce a current consumption by blocking an unnecessary power through a power on/off of each of lightings 231 through 235. In addition, the user may adjust brightness each of lightings 231 through 235 to provide a minimum brightness, and may reduce the current consumption.

According to an aspect of an embodiment, a plurality of lighting systems may be installed in a large structure such as a building. In order to control such plurality of lighting systems individually or in a group, the lighting control system 200 as illustrated in FIG. 2 may be needed. The lighting control system 200 may, in real time, control on/off, dimming, state information and current consumption of lighting systems installed on each floor or at a particular area, and may detect areas of wasting energy and minimize the wasting.

In this case, when network information about a plurality of lighting apparatuses set up may not correct, difficulties may follow in controlling all or a portion of the plurality of lighting apparatuses. When network information about the lighting apparatus may not be correct, the lighting control system 200 may initialize network information about the lighting apparatus and set up correct network information.

FIG. 3 is a perspective view illustrating a set-up of a wireless lighting network according to an aspect of an embodiment.

According to an aspect of an embodiment, a lighting control system may include a server, a gateway, a remote control and a lighting apparatus including a wireless lighting control module. A network formation may be necessary to control the lighting apparatus, and lighting apparatuses may be necessary to be connected to the gateway configured to perform a moderation role on a wireless lighting control network.

The gateway may include a wireless communication module capable of being connected to a smart device wirelessly, and may include the wireless communication module capable of being connected to the lighting apparatus for a lighting control of the lighting apparatus.

According to an aspect of an embodiment, when a lighting apparatus may be connected to not a first gateway 320 to which the lighting apparatus may have been connected, but to a gateway 350, a network may be formed to the first gateway 320 after separating a network connected to the second gateway 350.

Referring to FIG. 3, there may be a first residential space 310 and a second residential space 340. The first residential space 310 may include the first gateway 320 and lighting apparatus 331 through 333 to be used in the first residential space 310. In addition, the second residential space 340 may include the second gateway 350 and lighting apparatus 361 through 363 to be used in the second residential space 340. Lighting apparatuses of each residential space may be connected to gateways of each residential space.

When lighting apparatus 361 through 363 of the second residential space 340 are connected to the first gateway 320, the second gateway 350 may not control lighting apparatuses 361 through 363 of the second residential space 340. Thus, lighting apparatuses 363 through 363 of the second residential space 340 may be separated from a network connected to the first gateway 320, and the network may be reconfigured to be connected to the second gateway 350. Lighting apparatuses 361 through 363 of the second residential space 340 may be separated from the network connected to the first gateway 320 by initializing network information.

According to an aspect of an embodiment, when a power of the lighting apparatus may be on, the lighting apparatus may identify network information stored in a memory, and when network information may be identified as effective, the lighting apparatus may not perform a separate process. However, when network information may not be effective, the lighting apparatus may initialize network information and register network information about a correct connection of the lighting apparatus.

FIG. 4A is a block diagram illustrating a configuration of a lighting apparatus 400-1 according to an aspect of an embodiment.

According to an aspect of an embodiment, the lighting apparatus 400-1 may include a memory 410, a detection circuit 420 and a processor 430. All of illustrated components may not be necessary components. The lighting apparatus 400-1 may be realized by components more than illustrated components, or by components less than illustrated components. The components are described below.

According to an aspect of an embodiment, a memory 410 may store wireless network information about the lighting apparatus 400-1. Wireless network information may include at least one of gateway information, information about a wireless control apparatus, network identification (ID) information, media access control (MAC) address, and node information about the lighting apparatus 400-1; however, it is not limited thereto. In addition, the memory 410 may be realized by various kinds of storage media such as a flash memory, a hard disk and an electrically erasable and programmable read only memory (EEPROM).

According to an aspect of an embodiment, a detection circuit 420 may detect an AC signal supplied to the lighting apparatus 400-1. An AC is a current which has a magnitude and a direction periodically changing per time, and is generally represented by the alternating current (AC). The AC may have a sinusoidal wave, and may include a rectangular wave or a triangular wave. The AC signal may indicate the AC and an AC power signal also. The detection circuit 420 may detect the number of ON states and the number of OFF states of the AC signal during a predetermined period of time.

According to an aspect of an embodiment, a detection circuit 420 may be set up to detect periodically the on-state and the off-state of the AC signal. The detection circuit 420 may detect the time from a first off-state point to a last on-state point by detecting the number of ON states and the number of OFF states of the AC. For example, the detection circuit 420 may be set up to detect the number of ON states and the number of OFF states of the AC signal during about 10 seconds.

According to an aspect of an embodiment, a processor 430 may initialize wireless network information of the lighting apparatus 400-1, based on the detected AC signal. The processor 430 may obtain information determined to initialize wireless network information may be determined. The processor 430 may obtain information determined to initialize wireless network information, based on the number of ON states and the number of OFF states of the AC signal. For example, when the number of ON states and the number of OFF states are greater than the predetermined number, the processor 430 may initialize wireless network information. In detail, when a total of the number of ON states and the number of OFF states is greater than 7 for about 10 seconds, wireless network information may be initialized.

The processor 430 may determine whether wireless network information of the lighting apparatus 400-1 may be initialized, directly based on the AC signal. In addition, the processor 430 may receive information determined to initialize wireless network information by another component of the lighting apparatus 400-1 or by an external apparatus, and may initialize wireless network information based on received information. For example, when an on/off state of the AC signal may repeat, a power supply unit of the lighting apparatus 400-1 may transmit the AC signal to a communication module. Then, the communication module may detect the on-state and the off-state of the AC signal and determine the initialization of wireless network information. The communication module may transmit determined information to the processor 430, and the processor 430 may initialize wireless network information.

In addition, the processor 430 may control at least one of on/off, illuminance, and color temperature of illuminating units of the lighting apparatus 400-1, in addition to the initialization of wireless network information.

According to an aspect of an embodiment, a detection circuit 420 may include an input unit, a first converting unit, a second converting unit, a third converting unit and an output unit. However, components described above of the detection circuit 420 may not be indispensable components. The detection circuit 420 may be realized by more components than described components.

A configuration of the detection circuit 420 is described in detail. The input unit may receive the AC signal. The first converting unit may convert the AC signal to a first DC signal. The second converting unit may convert the first DC to a second DC signal which is predetermined in the communication module. The third converting unit may convert the AC signal to a level which is convertible to a digital signal in the communication module. The output unit may output a converted AC signal and the second DC signal. A connection relation of the configuration of the detection circuit 420 is described in FIGS. 5 through 8.

FIG. 4B is a block diagram illustrating a configuration of a lighting apparatus 400-2 according to an aspect of another embodiment. The lighting apparatus 400-2 illustrated in FIG. 4B may further include a communication module 440, in comparison with the lighting apparatus 400-1 of FIG. 4A.

In FIG. 4B, a memory 410, a detection circuit 420 and a processor 430 of the lighting apparatus 400-2 directly correspond to each configuration element of the lighting apparatus 400-1 of FIG. 4A, and descriptions duplicated as FIG. 4A are omitted.

According to an aspect of an embodiment, a communication module 440 may set up the wireless network of the lighting apparatus 400-2. When the processor 430 may initialize wireless network information, the communication module 440 may set up the wireless network different from the wireless network in which wireless network information has been set up prior to the initialization.

In addition, the communication module 440 may receive a control signal for an illuminating unit from an external apparatus or the processor 430, and may transmit an operation state of the illuminating unit to the external apparatus. The communication module 440 may include a control unit configured to control the illuminating unit. In addition, the control unit may include an analog to digital converter (ADC) input terminal to which status information, detected from an output terminal and a sensor for controlling pulse width modulation (PWM) of the illuminating unit, is input. Status information may include at least one of temperature information, illumination information, and user information.

According to an aspect of an embodiment, a communication module 440 may be a module for short-range communications within a predetermined distance. According to an aspect of the present inventive concept, a short-range communications technology may include wireless local area network (LAN), WiFi, Bluetooth, Zigbee, WiFi-direct (WFD), ultra wideband (UWB), infrared data association (IrDA), Bluetooth low energy (BLE), near field communication (NEC), etc.; however, it is not limited thereto.

According to an aspect of an embodiment, a lighting apparatus 400-2 may be of a bulb type, a parabolic aluminized reflector (PAR) lamp type and a flat panel type; however, it is not limited thereto.

The lighting apparatus may control an overall operation of the memory, the detection circuit, the processor and the communication module by using a central arithmetic processor. The central arithmetic processor may be formed as an array of a multiplicity of logic gates or as a combination of a general purpose microprocessor and a memory storing a program executable in the microprocessor. In addition, it will be readily apparent to one of ordinary skill in the art to which the present embodiment belongs that the central arithmetic processor may be formed using other types of hardware.

Various operations and applications performed by the lighting apparatus are described below. One of ordinary skill in the art to which the present inventive concept belongs will clearly understand that the memory, the detection circuit, the processor, and the communication module may have conventional structures, but the scope of the present inventive concept is not be limited by the terminology used to describe a particular configuration or a physical logical structure.

FIG. 5 is a block diagram illustrating a connection relation between elements of a detection circuit of a lighting apparatus according to an aspect of an embodiment.

Referring to FIG. 5, a detection circuit 420 may include an input unit 510, a first converting unit 520, a second converting unit 530, a third converting unit 540 and an output unit 550. Descriptions duplicated as FIG. 4 are omitted. The detection circuit 420 may be realized by more components or by fewer components than illustrated components.

According to an aspect of an embodiment, a first converting unit 520 and a second converting unit 530 may be connected, in series, and a third converting unit 540 may be connected, in parallel, to an input terminal of a first converting unit 510 and an output terminal of the second converting unit 530. The input terminal of the first converting unit 520 and the input terminal of the third converting unit 540 may be connected to an input unit 510 in series. The output terminal of the second converting unit 530 and the output terminal of the third converting unit 540 may be connected to an output unit 550 in series. The output unit 550 may detect the on-state and the off-state of the AC signal. A detailed example of the output unit 550 may be an analog to digital converter (ADC) of a communication module.

FIG. 6 is a circuit diagram illustrating the block diagram in FIG. 5 in detail according to an aspect of an embodiment.

According to an aspect of an embodiment, a detection circuit 420 of the lighting apparatus may be configured as the circuit of FIG. 6 in order to detect the on-state and the off-state of the AC signal.

According to an aspect of an embodiment, a first converting unit 520 may convert the AC signal to a first direct current signal. The first converting unit 520 may include a diode, an inductor and a resistance. A second converting unit 530 may convert the first direct current signal to a second direct current signal which has been pre-set up in a communication module. A third converting unit 540 may convert the AC signal to a level which is convertible to a digital signal in the communication module. The third converting unit 540 may include at least two of resistors and at least one of capacitors. In detail, at least one of capacitors may be connected to at least one of more than two resistors in parallel. As illustrated in FIG. 5, an output unit 550 may correspond to the communication module. Various particular elements such as detailed circuit elements are illustrated in FIG. 6. These embodiments are provided so that this disclosure will be thorough and complete, and will fully convey the concept of the inventive concept to those skilled in the art. In addition, a fact that other general purpose elements may be further included in addition to illustrated elements in FIG. 6 will be readily apparent to one of ordinary skill in the art.

According to an aspect of an embodiment, even when an AC power may be off, stored energy may be capable of supplying a power for the communication module to operate for a short period of time, since energy may be stored in an inductor or a capacitor. In this case, the communication module of the lighting apparatus may maintain a normal operation.

According to an aspect of an embodiment, an input may be possible within an operation range of the ADC of the communication module by adjusting a ratio of resistance of resistors R1 and R2 illustrated in a third converting unit 540. In addition, when an off-state of the AC signal may be detected in a detection circuit 420, the lighting apparatus may stop a PWM signal transmitted to a LED driver and prevent a waste of an unnecessary electrical power, in order to maintain a power supplied to the communication module.

The detection circuit 420 illustrated in FIG. 6 may have a faster response speed than the detection circuit 420 illustrated in FIG. 8, and may be more efficiently used for the initialization of a network of the lighting apparatus.

FIG. 7 is a block diagram illustrating a connection relation between elements of a detection circuit of a lighting apparatus according to an aspect of another embodiment.

Referring to FIG. 7, a detection circuit 420 may include an input unit 710, a first converting unit 720, a second converting unit 730, a third converting unit 740 and an output unit 750. Descriptions duplicated as FIG. 4 are omitted.

According to an aspect of another embodiment, a second converting unit 730 may be connected, in parallel, to a third converting unit 740 and the output terminal of a first converting unit 720 may be connected, in series, to the input terminal of a parallel circuit in which the second converting unit 730 and the third converting unit 740 are connected to each other. An input unit 710 and the first converting unit 720 may be connected, in series, to each other. The output terminal of the parallel circuit, in which the second converting unit 730 and the third converting unit 740 are connected to each other, may be connected, in series, to an output unit 750.

FIG. 8 is a circuit diagram illustrating the block diagram of FIG. 7 in detail according to an aspect of an embodiment.

An input unit 710, a first converting unit 720, a second converting unit 730, a third converting unit 740 and an output unit 750 illustrated in FIG. 8 may correspond to the first converting unit 520, the second converting unit 530, the third converting unit 540 and the output unit 550 of the configuration in FIG. 5, and descriptions duplicate as in FIG. 5 are omitted. The third converting unit 740 in FIG. 8, unlike the third converting unit 540 in FIG. 5, may be connected, in parallel, to the second converting unit 730 only.

A fact that other general purpose elements may be further included in addition to illustrated elements in FIG. 8 will be readily apparent to one of ordinary skill in the art.

FIG. 9 is a graph illustrating an alternating current signal detected over time according to an aspect of an embodiment.

FIG. 9 illustrates a plurality of wave shapes 920, 930 of an output, of a detection circuit configured as illustrated in FIG. 8. Referring to FIG. 9, when an input of the AC signal 910 may repeat on/off, a voltage between resistors R1 and R2 of a third converting unit illustrated in FIG. 8 may be illustrated as a first wave shape 920. In this case, a voltage of a communication module may be illustrated as a second wave shape 930. The communication module may identify a voltage change of the communication module via the ADC.

FIG. 10 is a flow chart illustrating a set-up flow of a network of a lighting apparatus according to an aspect of an embodiment.

Referring to FIG. 10, in operation S1010, the lighting apparatus may turn on lightings either by a user's physical switching-on or by receiving a user's lighting-on signal.

In operation S1020, the lighting apparatus may identify wireless network information stored in a memory of the lighting apparatus. Wireless network information may include at least one of gateway information, information about a wireless control apparatus, network identification (ID) information, media access control (MAC) address, and node information about the lighting apparatus 400-1; however, it is not limited thereto.

In operation S1030, the lighting apparatus may identify whether wireless network information is effective S1030. When wireless network information may be effective, the lighting apparatus may maintain wireless network information. When wireless network information may not be effective, the lighting apparatus may perform operation S1040.

For example, when a first lighting apparatus, which may have been connected to a first gateway, may be connected to a second gateway, the first lighting apparatus may determine that wireless network information about the first lighting apparatus is not effective. In this case, the first lighting apparatus may initialize wireless network information and perform a connection of the first lighting apparatus to the first gateway.

In operation S1040, the lighting apparatus may reset up wireless network information. The lighting apparatus may initialize wireless network information previously installed, and reset up wireless network information with which the lighting apparatus may be connected.

FIG. 11 is a flow chart illustrating a set-up how of a network of a lighting apparatus according to an aspect of an embodiment.

Referring to FIG. 11, in operation S1110, the lighting apparatus may detect the AC signal supplied to the lighting apparatus. The AC signal may indicate an AC and an AC power signal.

In operation S1120, the lighting apparatus may initialize wireless network information of the lighting apparatus, based on the detected AC signal. A process of initializing wireless network information of the lighting apparatus is described in detail in FIG. 12.

In operation 1130, the lighting apparatus may set up a wireless network of the lighting apparatus in accordance with the initialization.

FIG. 12 is a flow chart illustrating a set-up flow of a network of a lighting apparatus according to another aspect of an embodiment.

Referring to FIG. 12, in operation 1210, the lighting apparatus may detect the number of ON states and the number of OFF states of the AC signal supplied to the lighting apparatus during a predetermined period of time.

In operation S1220, the lighting apparatus may identify whether the detected number of the on-state and the off-state is greater than a predetermined number. When the detected number is greater than the predetermined number, the lighting apparatus may perform an operation S1230. When the detected number is smaller than the predetermined number, the lighting apparatus may perform an operation S1210.

In operation S1230, the lighting apparatus may initialize wireless network information.

In detail, for example, when the number of ON states and the number of OFF states of the AC signal may exceed 8 during about 10 seconds, the lighting apparatus may be set up to initialize network information. When the number of ON states and the number of OFF states may be 9 during about 10 seconds, the lighting apparatus may initialize network information.

In a different method, the lighting apparatus may calculate a time from a first off state of the AC signal to an eighth on-state, and identify whether the time has passed about 10 seconds. When the time may exceed about 10 seconds, the lighting apparatus may initialize network information of the lighting apparatus.

In operation S1240, the lighting apparatus may set up a network different from the network which has been set up prior to the initialization of wireless network information.

Apparatus described above may be realized by hardware component, software component and/or a combination of hardware component and software component. For example, apparatus and component described in embodiments may be realized by using at least one of general purpose computers or particular purpose computers, such as a processor, an arithmetic logic unit (ALU), digital signal processor, a microcomputer, field programmable array (FPA), programmable logic unit (PLU), a microprocessor and other apparatus capable of performing an instruction and responding.

A processing apparatus may perform an operation system (OS) or at least one of software applications to be performed on the operating system. In addition, the processing apparatus may respond to an execution of software, and may access to, store, manipulate, process and generate data.

For convenience of understanding, the processing apparatus is described as including a single processing element in some cases. However, one of ordinary skill in the art will apparently know that the processing apparatus may include a plurality of processing elements which may be of the same type or a plurality of types. For example, the processing apparatus may include a plurality of processors or one processor and one controller. In addition, other processing configurations such as a parallel processor may be possible.

Software may include a computer program, a code, an instruction, or a combination of at least one of them, and may be executed so that the processing apparatus operates as desired or may independently or collectively control the processing apparatus.

Software and/or data may be embodied, in order to be interpreted by the processing apparatus or to provide a command or data to the processing apparatus, in a type of a machine, a component, a physical apparatus, virtual equipment, computer storing medium or apparatus, or a transmitted signal wave, either permanently or temporarily. Software may be distributed to computer systems connected through a network and may be stored or executed in a distribution manner. Software and/or data may be stored in at least one of non-transitory computer-readable recording medium.

The inventive concept can also be embodied as computer readable codes on a non-transitory computer-readable recording medium. The non-transitory computer-readable recording medium is any data storage device that can store programs or data which can be thereafter read by a computer system. Program codes to be recorded on such medium can be particularly designed and configured according to the inventive concept, or any readily available medium publically known to one of ordinary skill in the art of computer software may be used.

The non-transitory computer-readable recording medium is any data storage device that can store programs or data which can be thereafter read by a computer system. Examples of the computer readable recording medium include optical media such as read-only memory (ROM), random-access memory (RAM) and CD-ROMs, magneto-optical media such as floptical disk, and specially configured hardware devices, to store and execute program commands, such as ROM, RAM and floppy disks.

An example of a program command may include not only a machine language code such as a product by a compiler but also a high-level language code executable by a computer by using an interpreter, etc.

The hardware apparatus described above may be configured to operate by using at least one software module in order to perform operations described in the above embodiments.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The invention claimed is:

1. A lighting apparatus comprising:
a memory configured to store wireless network information of the lighting apparatus;
a detection circuit configured to, when an alternating current signal is being supplied to the lighting apparatus, detect the alternating current signal, for determining whether the lighting apparatus has been powered on; and
a processor configured to, in response to a determination that the lighting apparatus has been powered on,
determine whether network information previously used by the lighting apparatus to connect to a network and thereby allow the lighting apparatus to be controlled through the network is effective based on the stored wireless network information,
wherein the effective network information indicates the lighting apparatus is connected to a network covering a space where the lighting apparatus is currently located,
when the processor determines that the network information is effective,
maintain the network information, and
connect the lighting apparatus to the network covering the space where the lighting apparatus is currently located using the maintained network information, to thereby allow the lighting apparatus to be controlled through the network covering the space where the lighting apparatus is currently located, and
when the processor determines that the network information is not effective,
reset the network information to network information useable by the lighting apparatus based on the detected alternating current signal, and
connect the lighting apparatus to the network covering the space where the lighting apparatus is currently located using the reset network information, to thereby allow the lighting apparatus to be controlled through the network covering the space where the lighting apparatus is currently located.

2. The lighting apparatus of claim 1, further comprising:
a communication module configured to communicate with a network covering a space where the lighting apparatus was previously located in accordance with the maintained network information, and to communicate with the network covering the space where the lighting apparatus is currently located in accordance with the reset network information.

3. The lighting apparatus of claim 2, wherein the detection circuit comprises:
an input unit configured to receive the alternating current signal;
a first converting unit configured to convert the alternating current signal into a first direct current signal;

a second converting unit configured to convert the first direct current signal into a second direct current signal predetermined in the communication module;

a third converting unit configured to convert the alternating current signal to a signal which is convertible to a digital signal in the communication module; and an output unit configured to output the converted alternating current signal and the second direct signal.

4. The lighting apparatus of claim 3, wherein the first converting unit and the second converting unit are connected in series and the third converting unit is connected in parallel to an input terminal of the first converting unit and the output terminal of the second converting unit.

5. The lighting apparatus of claim 3, wherein the second converting unit is connected in parallel to the third converting unit, and an output terminal of the first converting unit is connected in series to an input terminal of a parallel circuit to which the second converting unit and the third converting unit are connected.

6. The lighting apparatus of claim 3, wherein the third converting unit comprises at least two of resistors and at least one of capacitors.

7. The lighting apparatus of claim 6, wherein the at least one of capacitors is connected in parallel to a single resistor from among the at least two of resistors.

8. The lighting apparatus of claim 1, wherein
the detection circuit is further configured to detect a number of ON states and a number of OFF states of the alternating current signal during a predetermined period of time, and
the processor is further configured to determine whether the lighting apparatus has been powered on based on the number of ON states and the number of OFF states.

9. The lighting apparatus of claim 8, wherein the processor is further configured to determine that the lighting apparatus has been powered on when a total of the number of ON states and the number of OFF states of the AC signal is greater than a predetermined number.

10. The lighting apparatus of claim 8, further comprising:
a communication module configured to communicate with a network covering a space where the lighting apparatus was previously located in accordance with the maintained network information, and to communicate with the network covering the space where the lighting apparatus is currently located in accordance with the reset network information, and
the detection circuit is further configure to supply power to the communication module when the alternating current signal is in the OFF state.

11. The lighting apparatus of claim 1, wherein the maintained network information includes identification information of a gateway of a network covering a space where the lighting apparatus was previously located, and the reset network information includes identification information of a gateway of the network covering the space where the lighting apparatus is currently located.

12. A method comprising:
by a lighting apparatus:
detecting, when an alternating current signal is being supplied to the lighting apparatus, the alternating current signal, for determining whether the lighting apparatus has been powered on; and
in response to a determination that the lighting apparatus has been powered on,
determining whether network information previously used by the lighting apparatus to connect to a network and thereby allow the lighting apparatus to be controlled through the network is effective based on wireless network information stored in a memory,
wherein the effective network information indicates the lighting apparatus is connected to a network covering a space where the lighting apparatus is currently located,
when the determining determines that the network information is still effective,
maintaining the network information, and
connecting the lighting apparatus to the network covering the space where the lighting apparatus is currently located using the maintained network information, to thereby allow the lighting apparatus to be controlled through the network covering the space where the lighting apparatus is currently located, and
when the determining determines that the network information is not effective,
resetting the network information to network information useable by the lighting apparatus based on the detected alternating current signal, and
connecting the lighting apparatus to the network covering the space where the lighting apparatus is currently located using the reset network information, to thereby allow the lighting apparatus to be controlled through the network covering the space where the lighting apparatus is currently located.

13. The method of claim 12, wherein the detecting the alternating current signal comprises detecting a number of ON states and a number of OFF states of the alternating current signal during a predetermined period of time.

14. The method of claim 13, further comprising:
determining that the lighting apparatus has been powered on when the detected number of ON states and the number of OFF states of the alternating current signal are greater than a predetermined number.

15. The method of claim 13, wherein the lighting apparatus includes a communication module configured to communicate with a network covering a space where the lighting apparatus was previously located in accordance with the maintained network information, and to communicate with the network covering the space where the lighting apparatus is currently located in accordance with the reset network information, and the method further comprises:
supplying power to the communication module when the alternating current signal is in the OFF state.

16. The method of claim 12, wherein the maintained network information includes identification information of a gateway of a network covering a space where the lighting apparatus was previously located, and the reset network information includes identification information of a gateway of the network covering the space where the lighting apparatus is currently located.

17. A non-transitory computer-readable recording medium storing a program including instructions that, when executed by a processor, cause a lighting apparatus to perform the method of claim 12.

* * * * *